(12) United States Patent
Fossum et al.

(10) Patent No.: US 6,654,777 B1
(45) Date of Patent: Nov. 25, 2003

(54) SINGLE PRECISION INVERSE SQUARE ROOT GENERATOR

(75) Inventors: Gordon Clyde Fossum, Austin, TX (US); Thomas Winters Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 09/627,221

(22) Filed: Jul. 27, 2000

(51) Int. Cl.$^7$ .............................................. G06F 7/552

(52) U.S. Cl. ...................................... 708/500; 708/502

(58) Field of Search .............................. 708/500, 502, 708/605

(56) References Cited

U.S. PATENT DOCUMENTS

| | | | | |
|---|---|---|---|---|
| 5,341,321 A | * | 8/1994 | Karp et al. .................. | 708/500 |
| 5,386,375 A | * | 1/1995 | Smith .......................... | 708/500 |
| 5,537,345 A | * | 7/1996 | Nakano ....................... | 708/605 |
| 5,847,979 A | * | 12/1998 | Wong et al. ................. | 708/500 |
| 6,349,319 B1 | * | 2/2002 | Shankar et al. ............. | 708/500 |
| 6,385,713 B2 | * | 5/2002 | Yung ........................... | 712/22 |

* cited by examiner

Primary Examiner—David H. Malzahn
(74) Attorney, Agent, or Firm—Joseph P. Lally; Mark E. McBurney

(57) ABSTRACT

A floating point inverse square root circuit is disclosed. The circuit is configured to receive a floating point value comprised of a sign bit, an exponent field, and a mantissa field. The inverse square root circuit includes a lookup table configured to receive at least a portion of the floating point value and further configured to generate an initial approximation ($x_0$) of the inverse square root of the floating point value from the received portion of the floating point value. The inverse square root circuit further includes a first estimation circuit that receives the initial approximation from the lookup table and at least a portion of a value L derived from the floating point value mantissa field (M) and further configured to produce a first approximation ($x_1$) of the floating point value's inverse square root based upon L and $x_0$ where $x_1$ is a more accurate estimate of the inverse square root than $x_0$. The first estimation circuit may include first, second, and third fixed point multiplication units and first and second fixed point adders where the first multiplication unit is configured to square the initial approximation $x_0$, the first fixed point adder is configured to receive as its inputs the initial approximation $x_0$ and the output of a first shift register that receives the initial approximation $x_0$ as its input, and the second multiplication unit is configured to multiply the output of the first multiplication unit by the initial approximation $x_0$. The third multiplication unit may be configured to multiply the output of the second multiplication unit by L and the second adder may be configured to add the output of the first adder with a shifted and 2's complemented version of the output of the third multiplier to produce the first approximation $x_1$. The value L may comprise the normalized mantissa field if the exponent of the floating point value is odd and two times the normalized mantissa field if the exponent of the floating point value is even.

24 Claims, 5 Drawing Sheets

SINGLE PRECISION INVERSE SQUARE ROOT GENERATOR

BACKGROUND

1. Field of the Present Invention

The present invention generally relates to computer graphics and more particularly to a circuit that calculates sphere mode texture coordinates as part of a geometry processing device in a graphics adapter.

2. History of Related Art

Graphics display subsystems are almost universally encountered in microprocessor based computer systems to facilitate a variety of graphics tasks and applications including computer-assisted drafting, architectural design, simulation trainers for aircraft and other vehicles, molecular modeling, virtual reality applications, and video games. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling 3D graphic images. In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

Typically a software application program generates a 3D graphics scene, and provides the scene, along with lighting attributes, to an application programming interface (API) such as the OpenGL® API developed by Silicon Graphics, Inc. Complete documentation of OpenGL® is available in M. Woo et al., *OpenGL Programming Guide: The Official Guide to Learning OpenGL, Version* 1.2 (Addison Wesley Longman, Inc. 1999) and D. Schreiner, *OpenGL Reference Manual, Third Edition: The Official Reference Document to OpenGL, Version* 1.2 (Addison Wesley Longman, Inc. 1999), both of which are incorporated by reference herein.

A 3D graphics scene typically includes a number of polygons that are delimited by sets of vertices. The vertices are combined to form larger primitives, such as triangles or other polygons. The triangles (or polygons) are combined to form surfaces, and the surfaces are combined to form objects. Each vertex is associated with a set of attributes. Vertex attributes may include a position, including three Cartesian coordinates x, y, and z, a material color, which describes the color of the object to which the vertex belongs, and a normal vector, which describes the direction to which the surface is facing at the vertex. Each vertex may also be associated with texture coordinates and/or an alpha (transparency) value. In addition, the scene itself may be associated with a set of attributes including, as examples, an ambient color that typically describes the amount of ambient light and one or more individual light sources. Each light source has a number of properties associated with it, including a direction, an ambient color, a diffuse color, and a specular color.

Rendering is employed within the graphics system to create two-dimensional image projections of a 3D graphics scene for display on a monitor or other display device. Typically, rendering includes processing geometric primitives (e.g., points, lines, and polygons) by performing one or more of the following operations as needed: transformation, clipping, culling, lighting, fog calculation, and texture coordinate generation. Rendering further includes processing the primitives to determine component pixel values for the display device, a process often referred to specifically as rasterization.

The OpenGL® API and other API's such as the DirectX® API from Microsoft define the allowed vertex and scene attributes and the equations used to determine attribute values. In a conventional graphics adapter, the calculations specified by a particular API are implemented in software. It will be appreciated that software calculations can adversely affect the performance of the graphics adapter, especially if the equations require complex, floating point calculations. It would therefore be desirable to implement, to the extent feasible, some or all of the calculations specified by a particular graphics API in dedicated hardware circuitry. Moreover, it would be desirable if the implemented solution balanced improved performance against cost by optimizing the hardware design to account for such factors as, the frequency with which the particular function or equation is invoked and the speed required of the particular equation.

Among the various calculations specified by the API, it is fairly common to require the inverse square root of a floating point number. It would be desirable to implement the calculation of a floating point's inverse square root in a dedicated hardware circuit that utilizes sufficient resources to perform the calculations in significantly less time than required to perform the same calculation in software while not unnecessarily increasing the cost or size of the graphics adapter.

SUMMARY OF THE INVENTION

The goal identified above is achieved with a floating point inverse square root circuit according to the present invention. The circuit is configured to receive a floating point value comprised of a sign bit, an exponent field, and a mantissa field. The inverse square root circuit includes a lookup table configured to receive at least a portion of the floating point value and further configured to generate an initial approximation ($x_0$) of the inverse square root of the floating point value from the received portion of the floating point value. The inverse square root circuit further includes a first estimation circuit that receives the initial approximation from the lookup table and at least a portion of a value L derived from the floating point value mantissa field (M) and further configured to produce a first approximation ($x_1$) of the floating point value's inverse square root based upon L and $x_0$ where $x_1$ is a more accurate estimate of the inverse square root than $x_0$. The first estimation circuit may include first, second, and third fixed point multiplication units and first and second fixed point adders where the first multiplication unit is configured to square the initial approximation $x_0$, the first fixed point adder is configured to receive as its inputs the initial approximation $x_0$ and the output of a first shift register that receives the initial approximation $x_0$ as its input, and the second multiplication unit is configured to multiply the output of the first multiplication unit by the initial approximation $x_0$. The third multiplication unit may be configured to multiply the output of the second multiplication unit by L and the second adder may be configured to add the output of the first adder with a shifted and 2's complemented version of the output of the third multiplier to produce the first approximation $x_1$. The value L may comprise the normalized mantissa field if the exponent of the floating point value is even and two times the normalized mantissa field if the exponent of the floating point value is odd.

BRIEF DESCRIPTION OF THE DRAWINGS

Other objects and advantages of the invention will become apparent upon reading the following detailed description and upon reference to the accompanying drawings in which.

Figure 1A:
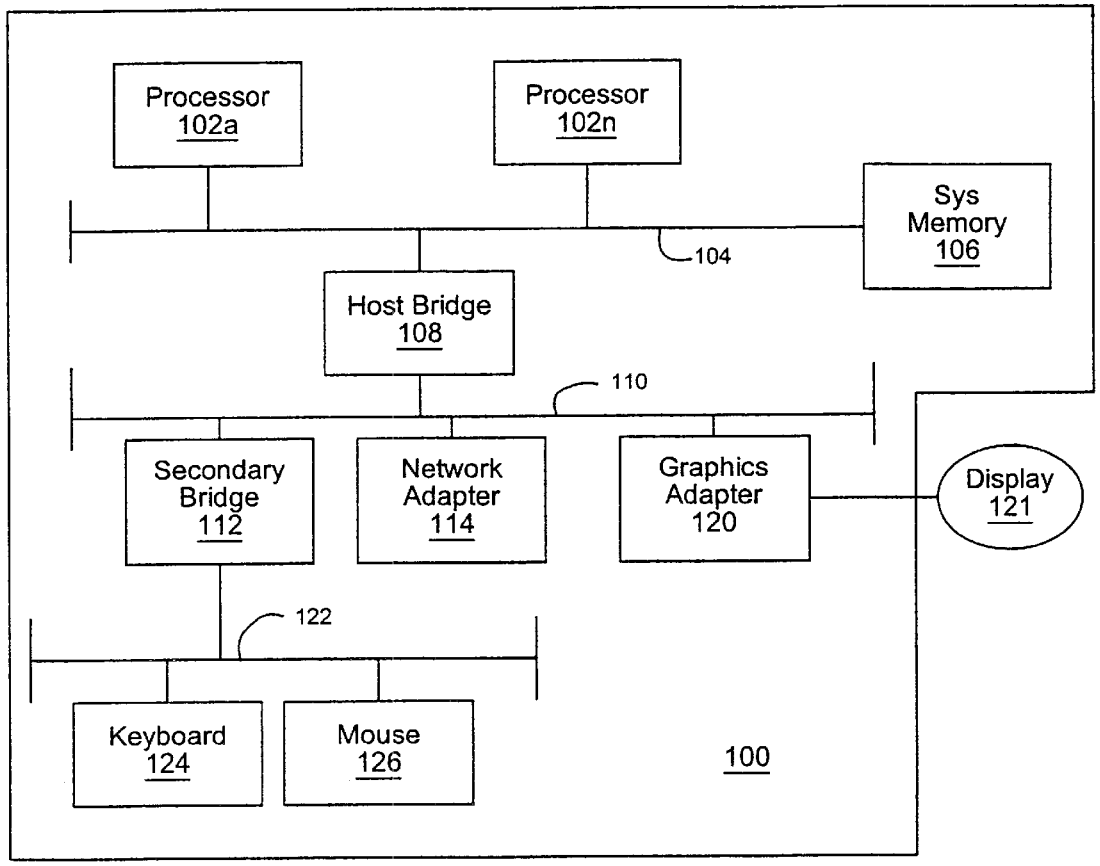
FIG. 1A and FIG. 1B are block diagrams emphasizing selected hardware elements and software elements, respectively, of a data processing system according to one embodiment of the pet invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1A is a block diagram of selected hardware elements of a data processing system 100 according to one embodiment of the present invention. In the depicted embodiment, system 100 includes one or more processor(s) 102a through 102n (generically or collectively referred to herein as processor(s) 102) are connected to a system bus 104. Processors 102 may be implemented with any of a variety of microprocessor components including, as examples, PowerPC® processors from IBM Corporation, SPARC® processors from Sun Microsystems, and x86 compatible architectures such as the Pentium® family of processors from Intel Corporation and the Athlon® family of processors from Advanced Micro Devices, Inc.

A system memory (RAM) 106 is accessible to processors 102 via system bus 104. A host bridge 108 is connected between system bus 104 and an IO bus 110. IO bus 110 is typically implemented as a PCI bus (as specified in PCI Local Bus Specification Rev. 2.2 available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 120 that provides support for legacy IO devices such as a keyboard 124 and a mouse 126. System 100 further includes a graphics adapter 120 connected to IO bus 110. The graphics adapter 120 is enabled to process graphics data received via IO bus 110 and typically includes a video controller that controls the image displayed on a display device 121.

Figure 1B:
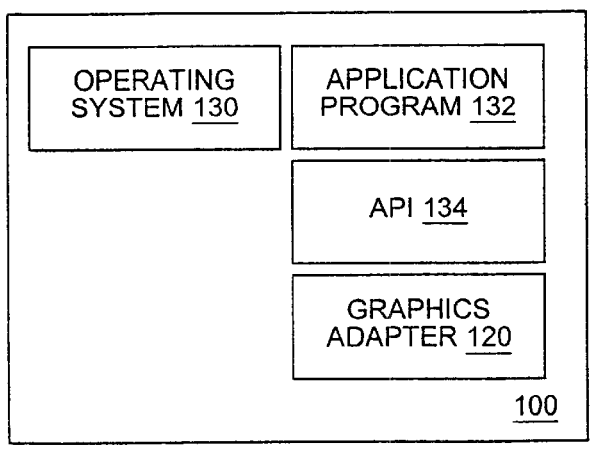

Referring now to FIG. 1B, a conceptual illustration of the system software relevant to the present disclosure is depicted. During system operation, system memory 106 may include all or portions of an operating system 130. Suitable operating systems include the AIX® operating system from IBM Corporation (or another Unix derivative operating system), a Windows® family operating system from Microsoft, or a network operating system such as JavaOS® from Sun Microsystems. An application program 132 generates graphics scenes that are passed to an API 134. In an embodiment particularly relevant to the present disclosure, API 134 may be the OpenGL® API, the DirectX® API, or another suitable 3D programming interface. API 134 processes graphics scenes generated by application program 132 and, via graphics adapter 120, maintains the contents of a video display screen, plotter, or other suitable output device.

Figure 2:
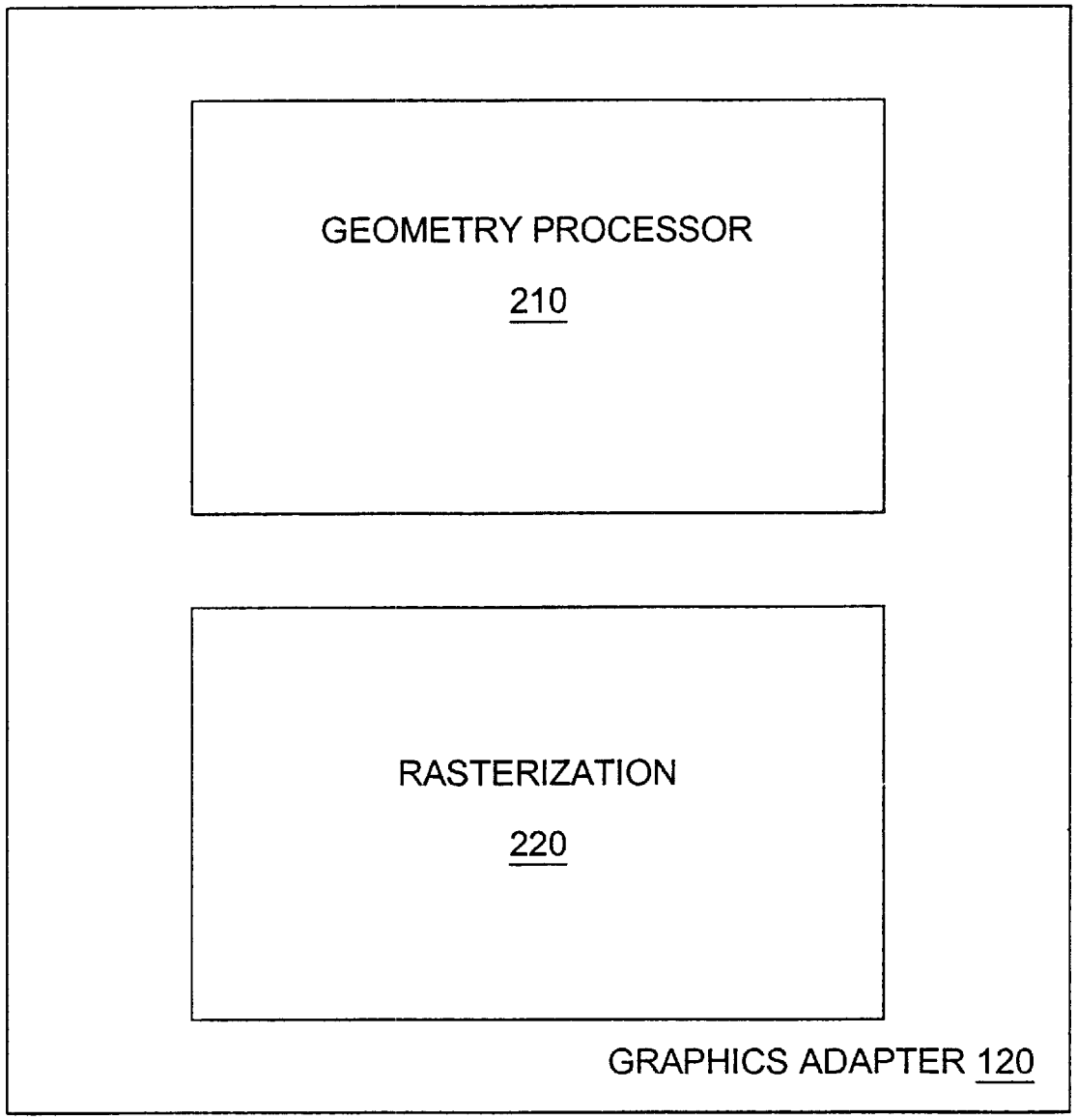
FIG. 2 is a block diagram of an embodiment of the graphics adapter of FIG. 1A.

As depicted in FIG. 2, graphics adapter 120 includes a geometry processor 210 and a rasterization portion (rasterizer) 220. The geometry processor 210 performs complex calculations in response to data received from API 134 to generate the attributes specified by API 134. Rasterizer 220 determines pixel values for the display device based upon information received from geometry processor 210 and maintains the contents of a frame buffer or other suitable graphics storage facility that is used to store a representation of the image that is displayed by the display device.

Figure 3:
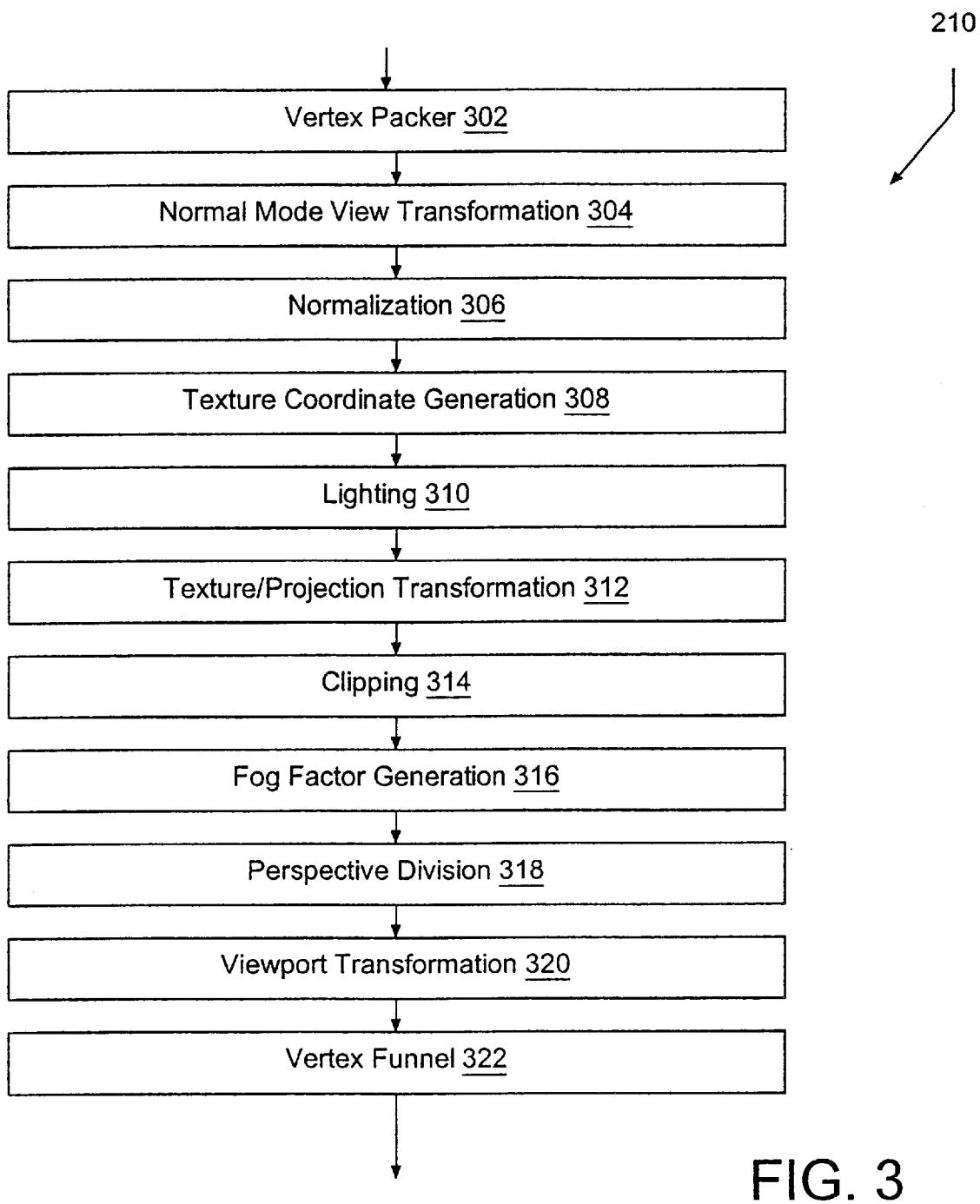
FIG. 3 is a block diagram of an embodiment of a geometry pipeline of the graphics adapter of FIG. 2.

Referring now to FIG. 3, a simplified block diagram of one embodiment of a geometry processor (also referred to as geometry pipeline) 210 is presented. In the depicted embodiment, geometry pipeline 210 receives data generated by API 134. In one embodiment, geometry processor 210 includes an interface that receives data, including commands and object coordinates, from IO bus 110 in 32-bit chunks. A vertex packer 302 converts the 32-bit chunks into a vertex width internally supported by geometry pipeline 210. At various stages in pipeline 210, the vertex width may vary depending upon the data that is required by the stage. In addition, vertex packer 302 provides default values (pursuant to the API 134) for vertex attributes that are not specified by the application program.

Vertex packer 302 forwards object coordinates to normal/model view transformation stage 304 where the normal vector is transformed from object space into eye space and the object coordinates are transformed into eye coordinates by translating, scaling, and rotating objects. The normalization stage 306 changes a normal vector to a vector of unit length (i.e., a vector having a magnitude of 1.0), while preserving the direction of the original vector. In addition, normalization stage 306 may generate normalized eye coordinates. The texture coordinate generation block 308, as its name implies, is responsible for generating object linear, eye linear, or spherical texture coordinates.

The lighting stage 310 generates the color of each vertex of an object based on the orientation of the object and its material properties as well as the properties of the scene and any light sources that are defined. Texture/projection transformation stage 312 transforms texture coordinates and moves objects into a viewing volume by transforming eye coordinates into clip coordinates by translating, rotating, and scaling objects. Perspective projection makes objects that are further away from the viewer appear smaller whereas orthogonal projection does not.

Clipping stage 314 clips objects to a defined viewing volume while fog factor generation stage 316 makes objects fade into the distance by making objects further from the viewer less visible than objects closer to the viewer. The perspective division stage 318 transforms clip coordinates to normalized device coordinates [−1,+1] by dividing by the 4th coordinate (the W coordinate). The viewport transformation stage 320 facilitates the rasterization process by transforming normalized device coordinates into screen or window coordinates. In addition, viewport transformation stage 320 may convert one or more floating point values to fixed point values. Finally, the vertex funnel 322 converts the internal vertex format into a 32-bit format suitable for an output interface of geometry processor 210.

One or more of the stages identified in FIG. 3, including normalization stage 306, lighting stage 310, and clipping stage 314 are typically required to compute the inverse square root of a floating point value as part of the geometry processing. The present invention contemplates a dedicated circuit for computing the inverse square root of a floating point value using fixed point calculations to reduce the number of cycles required to complete the computation.

Figure 4:
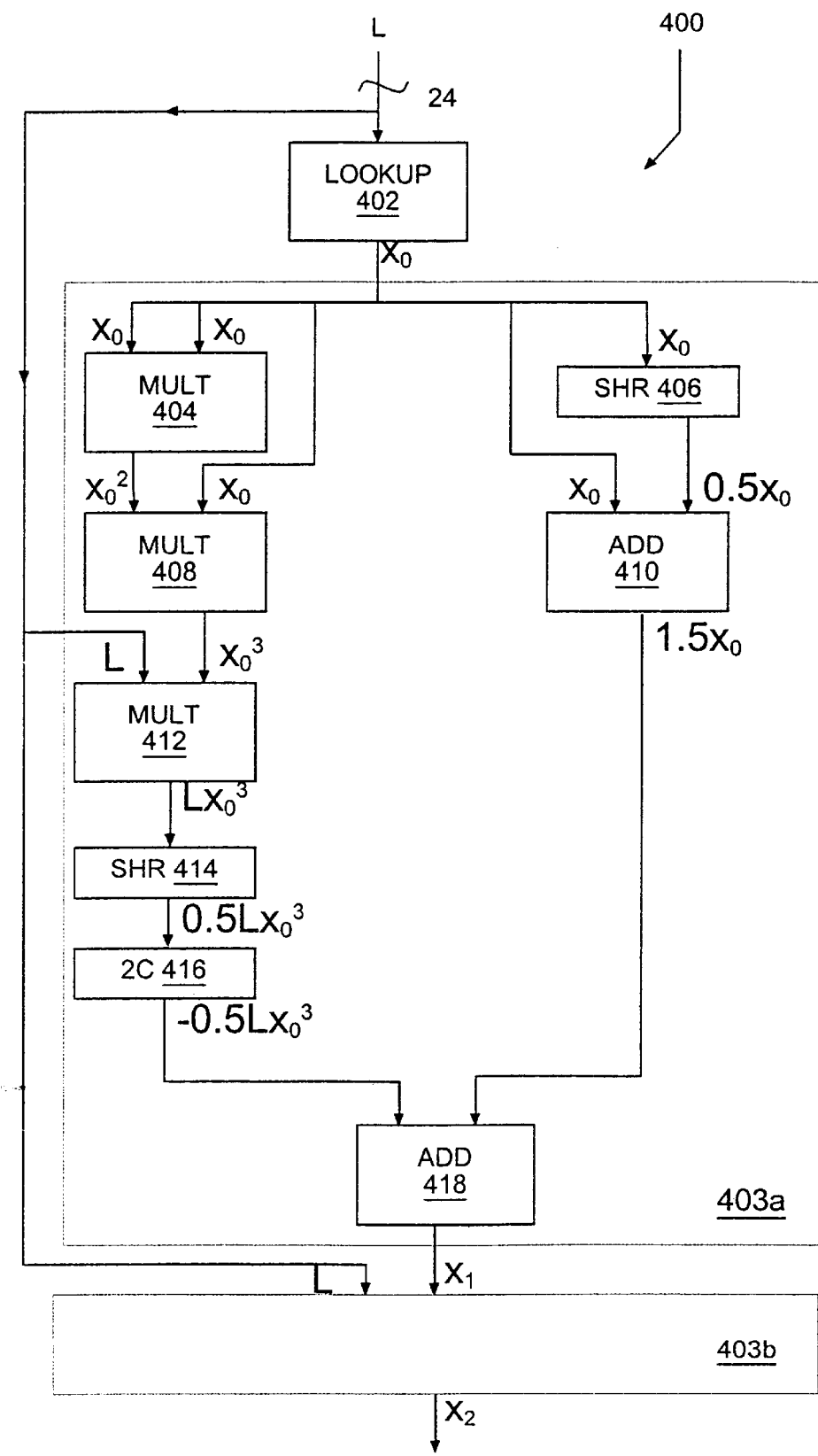
FIG. 4 is a block diagram illustrating functional blocks of a floating point inverse square root circuit suitable for use in various stages of the geometry pipeline of FIG. 3.

Turning now to FIG. 4, a block diagram illustrating an inverse square root circuit 400 according to one embodiment of the present invention is depicted. Generally speaking, inverse square root circuit 400 is configured to receive a 32-bit single precision floating point number formatted according to the IEEE Standard for Binary Floating-Point Arithmetic (IEEE Std No. 0754P-1985) available from the IEEE and incorporated by reference herein. The inverse square root circuit 400 produces a 32-bit floating point value that represents the inverse square root (i.e., $x^{-0.5}$) of the floating point number received. Inverse square root circuit 400 achieves improved performance over a software solution by implementing a circuit that approximates the root of a function, where each successive approximation is computed with fixed point arithmetic.

The portions of inverse square root circuit 400 depicted in FIG. 4 are utilized for "non-special" cases of floating point numbers. More specifically, the IEEE floating point specification defines special cases for ±0, ±∞, denormalized numbers (numbers less than $2^{-126}$), and non-numbers, also referred to as Not-A-Number or NaN's). For all other numbers (i.e., non-zero values of x where $2^{-126} < |x| < 2^{127}$), inverse square root circuit 400 is used to compute an estimate of the inverse square root of a floating point value.

The single precision IEEE floating point format defines the format for a 32-bit value comprising bits $b_0$ through $b_{31}$, where $b_0$ is the most significant bit, as follows:

$b_0$=S (sign bit)
$b_1$–$b_8$=E (exponent field)
$b_9$–$b_{31}$=M (mantissa field)

The special cases referred to above occur when the exponent E=0 or 0xFF. For all other values of E, the value of the floating point number is $V = -1^S * 2^{(E-127)} * 1.M$, where 1.M is a 24-bit binary representation of a value greater than or equal to 1 and less than 2. A floating point number with the value 0100 0000 0110 0000 0000 0000 0000 0000 (0x40600000) has S=0, E=128, and M=0.1100 b. Thus:

$$V = -1^0 * 2^{128-127} * 1.11 \text{ b}$$
$$= 2 * 1.11 \text{ b}$$
$$= 11.1 \text{ b}$$
$$= 3.5$$

For all non-special cases, the object is to find:

$$V^{-0.5} = ((-1^S) * 2^{(E-127)} * 1.M)^{-0.5}$$
$$= -1^{S/2} * 2^{(127-E)/2} * 1.M^{-0.5}$$

Since the invention is concerned with square roots, it is assumed that the floating point value is positive (i.e., S=0). Thus the expressed is simplified to:

$$V^{-0.5} = 2^{(127-E)/2} * 1.M^{-0.5}$$

If the exponent of the left hand multiplicand is even, the left hand multiplicand is trivially determined ($2^I$ where I is an integer) and the determination of the inverse square root of V, therefore, boils down to determining $K^{-0.5}$, Where K=1.M. If the left hand multiplicand is odd, the exponent can be made even by manipulating the mantissa. More specifically, if E in the equation above is even, the expression for V can be manipulated by multiplying the mantissa by 2 and subtracting 1 from the exponent (i.e., if $V = 2^{(E-127)} * K$ then $V = 2^{(E-128)} * 2K$). In this case, since the value E-128 is known to be even, the determination of V boils down to determining 2K where K=1.M. If, for example, K=1.1010 b and E-128 is even, the determination of $V^{-0.5}$ would require determining the inverse square root of 2K=11.010 b. Since K can range in value from 1 to 2, 2K can range in value from 2 to 4 and, therefore, the circuit must determine the inverse square root of a value that ranges from 1 to 4. For purposes of the remainder of this disclosure, the value L refers to the value for which an inverse square root determination is required. Thus, L=K=1.M if E-127 is even and L=2K IF E-127 is odd.

To determine an estimate of $L^{-0.5}$ using fixed point calculations, one embodiment of the present invention implements a formula for approximating the root of a function. Since the goal is to find the value $1/L^{1/2}$, a function f(x) is created whose root is the desired value (i.e., f(x)=0 when $x=1/L^{1/2}$). Once such equation is:

$$f(x) = 1/x^2 - L$$

One embodiment of the invention employs Newton-Raphson techniques to approximate the root of f(x). According to Newton-Raphson, an initial estimate ($x_0$) of the root of the function is chosen. From the initial estimate, successive estimates of the root are determined according to the formula $$x_{n+1} = x_n - f(x_n)/f'(x_n)$$

For the case in which $f(x)=1/x^2-L$, it follows that $f'(x)=-2/x^3$. Thus, the Newton-Raphson equation for successive estimates of the root of the function for determining the inverse square root of a value L is:

$$x_{n+1} = x_n - \{(1/x_n^2 - L)/(-2/x_n^3)\} \quad \text{(Eq. 1)}$$
$$= x_n + 1/2(x_n - Lx_n^3)$$
$$= 1.5x_n - 0.5Lx_n^3$$

where $L = K = 1.M$ if $E - 127$ is even and $L = 2K$ otherwise.

As depicted in FIG. 4, inverse square root circuit 400 receives the value L where L is the normalized mantissa (1.M or K) of an IEEE formatted floating point value if the exponent E-127 of the floating point value is even and where L is 2K if the exponent E-127 is odd. Initially, the value L is used to obtain an initial estimate $x_0$ of the inverse square root ($1/L^{1/2}$). In the depicted embodiment, the value L is routed to a lookup table 402 that stores precise values of inverse square roots for a selected number of input values. In one embodiment, the high order 11 bits of the value L form an index into lookup table 402, which is configured as a 2K×12 bit table. While the size of table 402 may vary, the 2K×12 bit is of sufficient granularity (as measured by the number of index values) and precision (as measured by the number of bits in the output values) to result in more than adequate precision after just two iterations of Newton-Raphson. As a rule of thumb, the precision of a Newton-Raphson estimate doubles with each iteration. Thus, if the initial estimate has 12 bits of precision, the result should contain well in excess of the 23 bits of precision supported by single precision IEEE floating point.

The output $x_0$ of lookup table 402 represents the initial estimate of the inverse square root $1/L^{1/2}$ that will be used as a seed in the Newton-Raphson determination. As depicted in FIG. 4, the $x_0$ output from lookup table 402 forwarded to a first estimation circuit 403a. The depicted embodiment of inverse square root 400 includes first and second estimation circuits 403a and 403b. First estimation circuit 403a produces a first estimate $x_1$ of $L^{-1/2}$ from the initial estimate $x_0$ and second estimation circuit 403b produces a second estimate $x_2$ of $L^{-1/2}$ from the first estimate $x_1$. In the depicted embodiment, first and second estimation circuit 403a and 403b are substantially equivalent circuits except that, where the components of first estimator circuit 403a receives an input value $x_0$, the second estimator circuit 403b receives the input value $x_1$ (which is the output of first estimator circuit 403a).

In first estimator circuit both the initial estimate $x_0$ generated by lookup table 402 is connected to both inputs of a fixed point multiplier 404 to produce the value $x_0^2$. In an embodiment of inverse square root circuit 400 in which lookup table 402 generates a 12-bit value, the output $x_0^2$ of multiplier 404 may include up to 24 bits. The output $x_0$ from lookup table 402 is also routed to a divide-by-two circuit 406, which is implemented in the depicted embodiment with a 1-bit shift register. The output of divide-by-two circuit 406 serves as an input point to a fixed point adder 410 that receives $x_0$ as its other input to produce a value of $1.5x_0$.

The output of multiplier circuit 404 serves as an input to a second fixed point multiplier 408 that receives the value $x_0$ as its other input to produce the value $x_0^3$. The $x_0^3$ value is then multiplied by the input L to produce a value $Lx_0^3$. The $Lx_0^3$ value is then halved in divide-by-two circuit 414, which is implemented as a 1-bit shifter in the depicted embodiment, to generate the value $0.5Lx_0^3$. The opposite of this value is then produced by circuit 416, implemented as a 2's complement circuit in the depicted embodiment to produce the value $-0.5Lx_0^3$. The outputs of circuit 416 and adder 416 are routed to the inputs of a fixed point adder 418 to generate the first estimate $x_1$ of the inverse square of L, where $x1=1.5x_0 - 0.5Lx_0^3$.

The $x_1$ estimate is then manipulated in second estimator circuit 403b in the same manner as the initial estimate $x_0$ is manipulated in first estimator circuit 403a to obtain a second Newton-Raphson estimate $x_2$. More specifically, the $x_1$ value at the output of first estimator circuit 403a is cubed and multiplied by L to produce a value $Lx_1^3$. The value $Lx_1^3$ is then halved and multiplied by -1 to produce the value $-0.5Lx_1^3$. The $0.5Lx_1^3$ value is the added to a $1.5x_1$ to produce a second estimate $x_2$ where $x_2 = 1.5x_1 - 0.5Lx_1^3$). If the initial estimate $x_0$ is sufficiently accurate (i.e., the granularity and precision of lookup table 402 are adequate), the second estimate $x_2$ produced by inverse square root circuit 400 is fully accurate to the precision of the single precision floating point format (i.e., $x_1$ is precise to at least 23 mantissa bits).

Latching circuitry (not depicted) is typically included in inverse square root circuit 400 to control the timing of the values produced by the various components of reciprocator circuit 400. In one embodiment, the outputs of lookup table 402, multipliers 404, 408, and adders 410 and 418 are all latched. In addition, inverse square root circuit 400 may include multiplexing circuitry configured to generate appropriate output values when the input values are special cases. For input values of +0 (the result when E=0 and M=0), the result is forced to ±∞, for input values of ±∞ (the result when E=0xFF and M=0), the result is forced to ±0, and for input values of NaN (E=0xFF and M≠0), the result is forced to a predetermined NaN.

Denormalized input values (E=0 and M≠0), are typically treated as a separate case. Since the inverse square root of a denormalized value is generally within the precision supported by single precision IEEE floating point values, it is necessary to generate inverse square root values for denormalized values. This is achieved be extension of the case where the exponent is odd and the mantissa is manipulated. More specifically, the denormalized value is first normalized by multiplying the mantissa by 2 (i.e., shifting the mantissa left) until the most significant 1 bit in the mantissa is shifted out. If for example, the mantissa of a denormalized value is 0.00011, the mantissa is shifted four times to produce a normalized mantissa of 1.1. The exponent is decremented each time the mantissa is shifted. Since the IEEE exponent of all denormalized floating points is -126, the resulting exponent will have a value of -126-N, where N is number of times required to fully shift the most significant 1 bit in the mantissa. If the number N is odd, and additional shift of the mantissa and decrement of the exponent is performed to ensure that the exponent is even. After this manipulation, the mantissa, may be forwarded to inverse square root circuit 400 and the exponent may be treated the same as exponents of normalized numbers.

Figure 5:
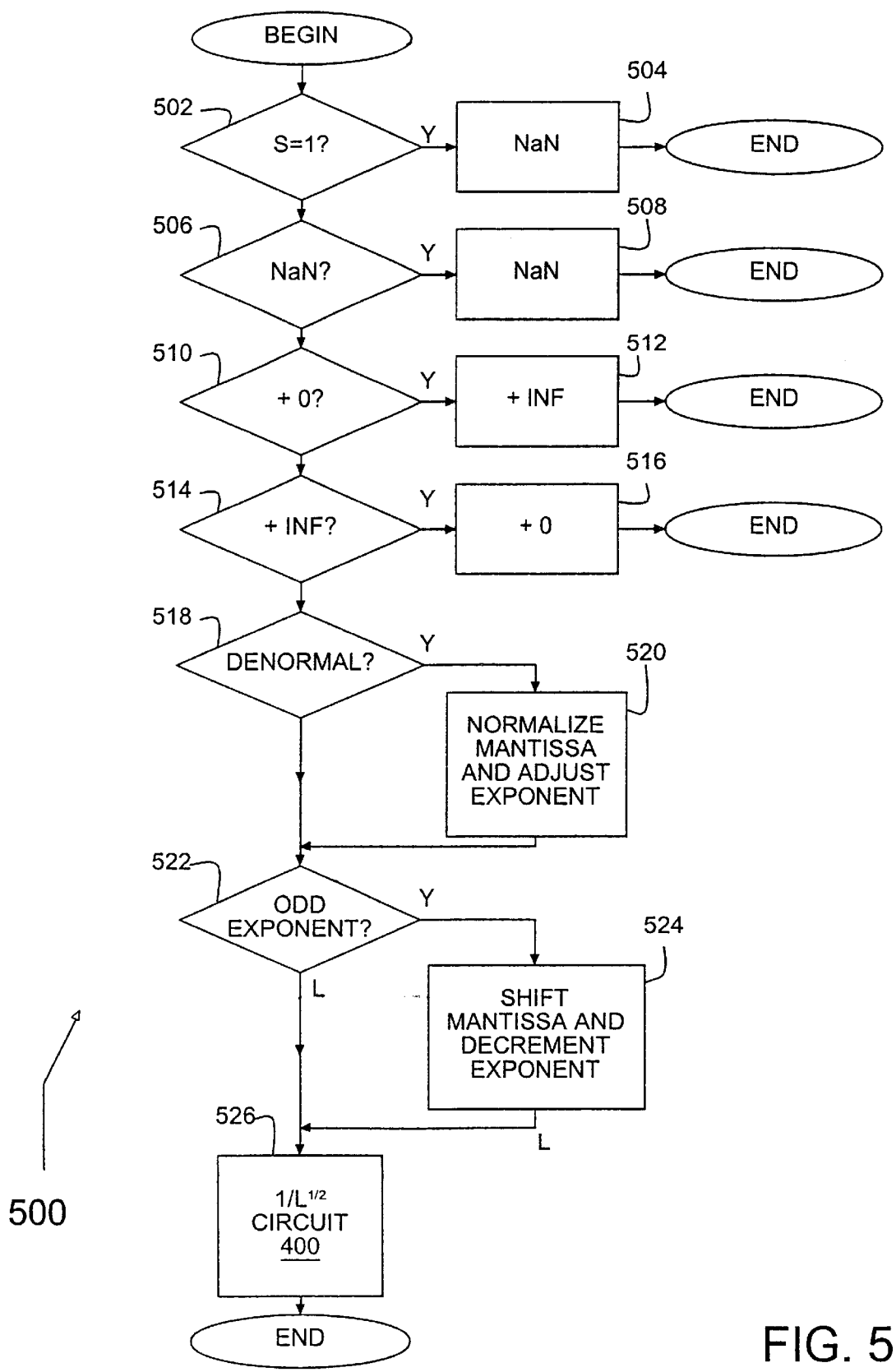
FIG. 5 is a flow diagram illustrating the operation of a floating point circuit according to an embodiment of the invention that includes the inverse square root circuit of FIG. 4.

Referring now to FIG. 5, a flow diagram illustrating the operational behavior of a floating point circuit 500 that incorporates inverse square root circuit 400, additional multiplexing circuitry to handle special cases, and appropriate shifting circuitry to handle denormalized numbers is illustrated. In the depicted embodiment, floating point circuit 500 receives a 32-bit IEEE formatted floating point number as its input. Floating point circuit 500 includes a multiplexer circuit, represented by the decision block 502, that determines if the input is a negative number (by examining the sign bit S) and, if so, generates (block 504) a predetermined NaN value for the output. The floating point circuit 500 further includes a multiplexer circuit represented by block 506 that determines if the input value is an IEEE NaN and, if so, generates (block 508) a predetermined NaN as the output. Similarly, a multiplexer circuit represented by block 510 determines if the input value is a +0 and generates with block 512 a +∞ value if so and a multiplexer circuit 514 determines if the input value is +∞ and generates with block 516 a +0 output if so.

Floating point circuit 500 further includes a multiplexing circuit represented by block 518 that determines if the floating point input is a denormalized number. If the input is a denormalized number, shift circuitry identified as block 520 shifts the mantissa appropriately (until the most significant 1 bit of the mantissa is shifted into the normalized position) and decrements the exponent for each shift of the mantissa. A multiplexer circuit represented by block 522 then determines if the floating point exponent is even or odd by looking at the least significant exponent bit. If the exponent is odd, shift circuit 524 shifts the mantissa once and decrements the exponent to place the floating point input into a form suitable for processing as described above by inverse square root circuit 400. The inverse square root circuit 400 produces the IEEE formatted mantissa portion of the output value. The exponent portion is handled by simple shift circuitry (not depicted) which divides the exponent value by two.

Since the output of inverse square root circuit 400 represent an estimate of the inverse square root of an input value that may range from 1 to 4, the output of the inverse square root circuit ranges from 1 to 0.5 and is, therefore, generally less than 1. Accordingly, a final normalization may be performed by shifting the output of inverse square root 400 a single time and decrementing the final exponent by 1 to place the final estimate of $1/L^{1/2}$ in IEEE floating point format.

It will be apparent to those skilled in the art having the benefit of this disclosure that the present invention contemplates a dedicated hardware solution for determining the inverse square root of a floating point number. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A floating point inverse square root circuit configured to receive a floating point value comprised of a sign bit, an exponent field, and a mantissa field, the inverse square root circuit comprising:
   a lookup table configured to receive at least a portion of the floating point value and further configured to generate an initial approximation ($x_0$) of the inverse square root of the floating point value corresponding to the received portion of the floating point value; and
   a first estimation circuit configured to receive the initial approximation from the lookup table and at least a portion of a value L derived from the floating point value mantissa field (M) and further configured to produce a first approximation ($x_1$) of the floating point value's inverse square root based upon L and $x_0$, wherein $x_1$ is a more accurate estimate of the inverse square root than $x_0$.

2. The circuit of claim 1, wherein the first estimation circuit includes first, second, and third fixed point multiplication units and first and second fixed point adders.

3. The circuit of claim 2, wherein the first multiplication unit is configured to square the initial approximation $x_0$.

4. The circuit of claim 2, wherein the first fixed point adder is configured to receive as its inputs the initial approximation $x_0$ and the output of a first shift register that receives the initial approximation $x_0$ as its input.

5. The circuit of claim 2, wherein the second multiplication unit is configured to multiply the output of the first multiplication unit by the initial approximation $x_0$.

6. The circuit of claim 2, wherein the third multiplication unit is configured to multiply the output of the second multiplication unit by L.

7. The circuit of claim 2, wherein the second adder is configured to add the output of the first adder with a shifted and 2's complemented version of the output of the third multiplier to produce the first approximation $x_1$.

8. The circuit of claim 1, further comprising a second estimation circuit configured to receive the value (L) and the first approximation ($x_1$) and further configured to produce a second approximation ($x_2$) of the floating point value's inverse square root based upon L and $x_1$, wherein $x_2$ is a more accurate estimate of the inverse square root than $x_1$.

9. The circuit of claim 1, wherein the value L comprises the normalized mantissa field K if the exponent of the floating point value is odd, and wherein L comprises 2K if the exponent of the floating point value is even.

10. A data processing system including processor and memory, comprising:
    an IO bridge connecting the processor to an IO bus, and
    a graphics adapter connected to the IO bus, the graphics adapter including a geometry pipeline wherein the pipeline includes an inverse square root circuit comprising:
       a lookup table configured to receive at least a portion of a floating point value and ford configured to generate an initial approximation ($x_0$) of the inverse square root of the floating point value corresponding to the received portion of the floating point value; and
       a first estimation circuit configured to receive the initial approximation from the lookup table and at least a portion of a value L derived from the floating point value mantissa field (M) and further configured to produce a first approximation ($x_1$) of the floating point value's inverse square root based upon L and $x_0$, wherein $x_1$ is a more accurate estimate of the inverse square root than $x_0$.

11. The data processing system of claim 10, wherein the first estimation circuit includes first, second, and third fixed point multiplication units and first and second fixed point adders.

12. The data processing system of claim 11, wherein the first multiplication unit is configured to square the initial approximation $x_0$.

13. The data processing system of claim 11, wherein the first fixed point adder is configured to receive as its inputs the initial approximation $x_0$ and the output of a first shift register that receives the initial approximation $x_0$ as its input.

14. The data processing system of claim 11, wherein the second multiplication unit is configured to multiply the output of the first multiplication unit by the initial approximation $x_0$.

15. The data processing system of claim 11, wherein the third multiplication unit is configured to multiply the output of the second multiplication unit by L.

16. The data processing system of claim 11, wherein the second adder is configured to add the output of the first adder with a shifted and 2's complemented version of the output of the third multiplier to produce the first approximation $x_1$.

17. The data processing system of claim 10, further comprising a second estimation circuit configured to receive the value (L) and the first approximation ($x_1$) and further configured to produce a second approximation ($x_2$) of the floating point value's inverse square root based upon L and $x_1$, wherein $x_2$ is a more accurate estimate of the inverse square root than $x_1$.

18. The data processing system of claim 10, wherein the value L comprises the normalized mantissa field K if the exponent of the floating point value is odd, and wherein L comprises 2K if the exponent of the floating point value is even.

19. A graphics adapter including a geometry pipeline wherein the pipeline includes an inverse square root unit, comprising:

a lookup table configured to receive at least a portion of a floating point value and further configured to generate an initial approximation ($x_0$) of the inverse square root of the floating point value corresponding to the received portion of the floating point value; and a first estimation circuit configured to receive the initial approximation from the lookup table and at least a portion of a value L derived from the floating point value mantissa field (M) and further configured to produce a first approximation ($x_1$) of the floating point value's inverse square root based upon L and $x_0$, wherein $x_1$ is a more accurate estimate of the inverse square root than $x_0$.

20. The graphics adapter of claim 19, wherein the first estimation circuit includes first, second, and third fixed point multiplication units and first and second fixed point adders.

21. The graphics adapter of claim 20, wherein the first multiplication unit is configured to square the initial approximation $x_0$.

22. The graphics adapter of claim 20, wherein the first fixed point adder is Configured to receive as its inputs the initial approximation $x_0$ and the output of a first shift register that receives the initial approximation $x_0$ as its input.

23. The graphics adapter of claim 20, wherein the second multiplication unit is configured to multiply the output of the first multiplication unit by the initial approximation $x_0$.

24. The graphics adapter of claim 20, wherein the third multiplication unit is configured to multiply the output of the second multiplication unit by L and the second adder is configured to add the output of the first adder with a shifted and 2's complemented version of the output of the third multiplier to produce the first approximation $x_1$.

* * * * *

UNITED STATES PATENT AND TRADEMARK OFFICE
CERTIFICATE OF CORRECTION

PATENT NO.      : 6,654,777 B1
DATED           : November 25, 2003
INVENTOR(S)     : Gordon Clyde Fossum and Thomas Winters Fox It is certified that error appears in the above-identified patent and that said Letters Patent is hereby corrected as shown below:

Column 3,
Line 21, paragraph should read -- FIG 1A and FIG 1B are block diagrams emphasizing selected hardware elements and software elements, respectively, of a data processing system according to one embodiment of the present invention; --

Column 5,
Line 63, Equation should read -- $b_9$-$b_{32}$=M(mantissa field) --

Column 6,
Line 17, Equation should read -- $=1^{-s/2} * 2^{(127-E)/2} * 1.M^{0.5}$ --

Column 10,
Lines 23-42, should read
-- 10. A data processing system including processor and memory, comprising:

an IO bridge connecting to processor to an IO bus, and a graphics adapter connected to the IO bus, the graphics adapter including a geometry pipeline wherein the pipeline includes an inverse square root circuit comprising:

a lookup table configured to receive at least a portion of a floating point value and further configured to generate an initial approximation ($x_0$) of the inverse square root of the floating point value corresponding to the received portion of the floating point value; and a first estimation circuit configured to receive the initial approximation from the lookup table and at least a portion of a value L derived from the floating point value matissa field (M) and further configured to produce a first approximation ($x_1$) of the floating point value's inverse square root based upon L and $x_0$, wherein $x_1$ is a more accurate estimate of the inverse square root than $x_0$.

UNITED STATES PATENT AND TRADEMARK OFFICE
CERTIFICATE OF CORRECTION

PATENT NO. : 6,654,777 B1
DATED : November 25, 2003
INVENTOR(S) : Gordon Clyde Fossum and Thomas Winters Fox It is certified that error appears in the above-identified patent and that said Letters Patent is hereby corrected as shown below:

Continuation of Column 10, lines 23-42,

22. The graphics adapter of claim 20, wherein the first fixed point adder is configured to receive as its inputs the initial approximation $x_0$ and the output of a first shift register that receives the initial approximation $x_0$ as its input. --

Signed and Sealed this

Third Day of August, 2004

JON W. DUDAS
*Acting Director of the United States Patent and Trademark Office*